United States Patent
Kim et al.

(10) Patent No.: US 12,451,203 B2
(45) Date of Patent: Oct. 21, 2025

(54) MEMORY DEVICE AND METHOD OF OPERATING THE MEMORY DEVICE

(71) Applicant: SK hynix Inc., Icheon-si (KR)

(72) Inventors: Jae Woong Kim, Icheon-si (KR); Kyu Nam Lim, Icheon-si (KR)

(73) Assignee: SK hynix Inc., Incheon-si (KR)

(*) Notice: Subject to any disclaimer, the term of this patent is extended or adjusted under 35 U.S.C. 154(b) by 66 days.

(21) Appl. No.: 18/521,063

(22) Filed: Nov. 28, 2023

(65) Prior Publication Data

US 2024/0404609 A1 Dec. 5, 2024

(30) Foreign Application Priority Data

May 30, 2023 (KR) .................. 10-2023-0069198

(51) Int. Cl.
*G11C 16/04* (2006.01)
*G11C 16/08* (2006.01)
*G11C 16/10* (2006.01)
*G11C 16/34* (2006.01)
*G11C 16/24* (2006.01)

(52) U.S. Cl.
CPC ...... *G11C 16/3459* (2013.01); *G11C 16/0483* (2013.01); *G11C 16/08* (2013.01); *G11C 16/10* (2013.01); *G11C 16/24* (2013.01)

(58) Field of Classification Search
CPC .................................................. G11C 16/04
See application file for complete search history.

(56) References Cited

U.S. PATENT DOCUMENTS

2018/0082731 A1* 3/2018 Lee .................. G11C 16/0483

FOREIGN PATENT DOCUMENTS

KR 1020140005701 A 1/2014
KR 1020210027973 A 3/2021

* cited by examiner

*Primary Examiner* — Jason Lappas
(74) *Attorney, Agent, or Firm* — WILLIAM PARK AND ASSOCIATES LTD.

(57) ABSTRACT

An embodiment of the present technology includes a memory device and a method of operating the memory device. The memory device includes a memory block, a peripheral circuit configured to increase a threshold voltage of memory cells selected among memory cells included in the memory block according to logic data, detect low-level cells having a threshold voltage higher than a reference voltage among memory cells having a threshold voltage lower than a verify voltage at a first time within a verify time set according the number of bits included into the logic data, and detect high-level cells having a threshold voltage higher than the verify voltage at a second time after the first time, and a control circuit configured to control the peripheral circuit in response to a command.

16 Claims, 12 Drawing Sheets

MEMORY DEVICE AND METHOD OF OPERATING THE MEMORY DEVICE

CROSS-REFERENCE TO RELATED APPLICATION

The present application claims priority under 35 U.S.C. § 119(a) to Korean patent application number 10-2023-0069198 filed on May 30, 2023, in the Korean Intellectual Property Office, the entire disclosure of which is incorporated by reference herein.

BACKGROUND

1. Technical Field

The present disclosure relates to a memory device and a method of operating the memory device, and more particularly, to a memory device configured to perform a program operation and a method of manufacturing the memory device.

2. Related Art

A memory device may include memory cells in which data is stored, and may be configured to perform a program, read, or erase operation.

The program operation performed in the memory device may include a program step for increasing a threshold voltage of the memory cells and a verify step for determining whether the threshold voltage increases to a target voltage.

The memory cells may store 1 bit or 2 bits or more of data according to a program method. For example, a method in which 1 bit of data is stored in one memory cell is referred to as a single level cell method, and a method in which 2 bits of data is stored in one memory cell is referred to as a multi-level cell method. A method in which 3 bits of data is stored in one memory cell is referred to as a triple level cell method, and a method in which 4 bits of data in one memory cell is stored is referred to as a quad level cell method. In addition to this, 5 bits or more of data may be stored in one memory cell.

As the number of bits stored in one memory cell increases, a storage capacity of the memory device may increase, but a time required for the program operation may increase.

SUMMARY

According to an embodiment of the present disclosure, a memory device may include a memory block, a peripheral circuit configured to increase a threshold voltage of memory cells selected among memory cells included in the memory block according to logic data, detect low-level cells having a threshold voltage higher than a reference voltage among memory cells having a threshold voltage lower than a verify voltage at a first time within a verify time set according the number of bits included into the logic data, and detect high-level cells having a threshold voltage higher than the verify voltage at a second time after the first time, and a control circuit configured to control the peripheral circuit in response to a command.

According to an embodiment of the present disclosure, a method of operating a memory device may include setting a verify voltage and a verify time according to the number of bits of logic data, increasing a threshold voltage of memory cells, detecting low-level cells having a threshold voltage higher than a reference voltage among memory cells having a threshold voltage lower than a verify voltage, detecting high-level cells having a threshold voltage higher than the verify voltage, and designating new logic data having the number of bits greater than that of the logic data to the low-level cells and the high-level cells.

According to an embodiment of the present disclosure, a method of operating a memory device may include increasing a threshold voltage of selected memory cells among memory cells in an erase state, and detecting memory cells having a threshold voltage lower than a reference voltage as a first logic program state and detecting memory cells having a threshold voltage higher than the reference voltage as a second logic program state higher than the first logic program state, among memory cells connected to even bit lines, among the selected memory cells.

DETAILED DESCRIPTION

Specific structural or functional descriptions disclosed below are exemplified to describe an embodiment according to the concept of the present disclosure. The embodiment according to the concept of the present disclosure is not construed as being limited to the embodiments described below, and may be variously modified and replaced with other equivalent embodiments.

Hereinafter, terms such as first and second may be used to describe various components, but the components are not limited by the terms. The terms are used for the purpose of distinguishing one component from another component.

An embodiment of the present disclosure provides a memory device capable of reducing the time required for a program operation and a method of operating the same.

An embodiment of the present technology may reduce the program operation time of the memory device.

Figure 1:
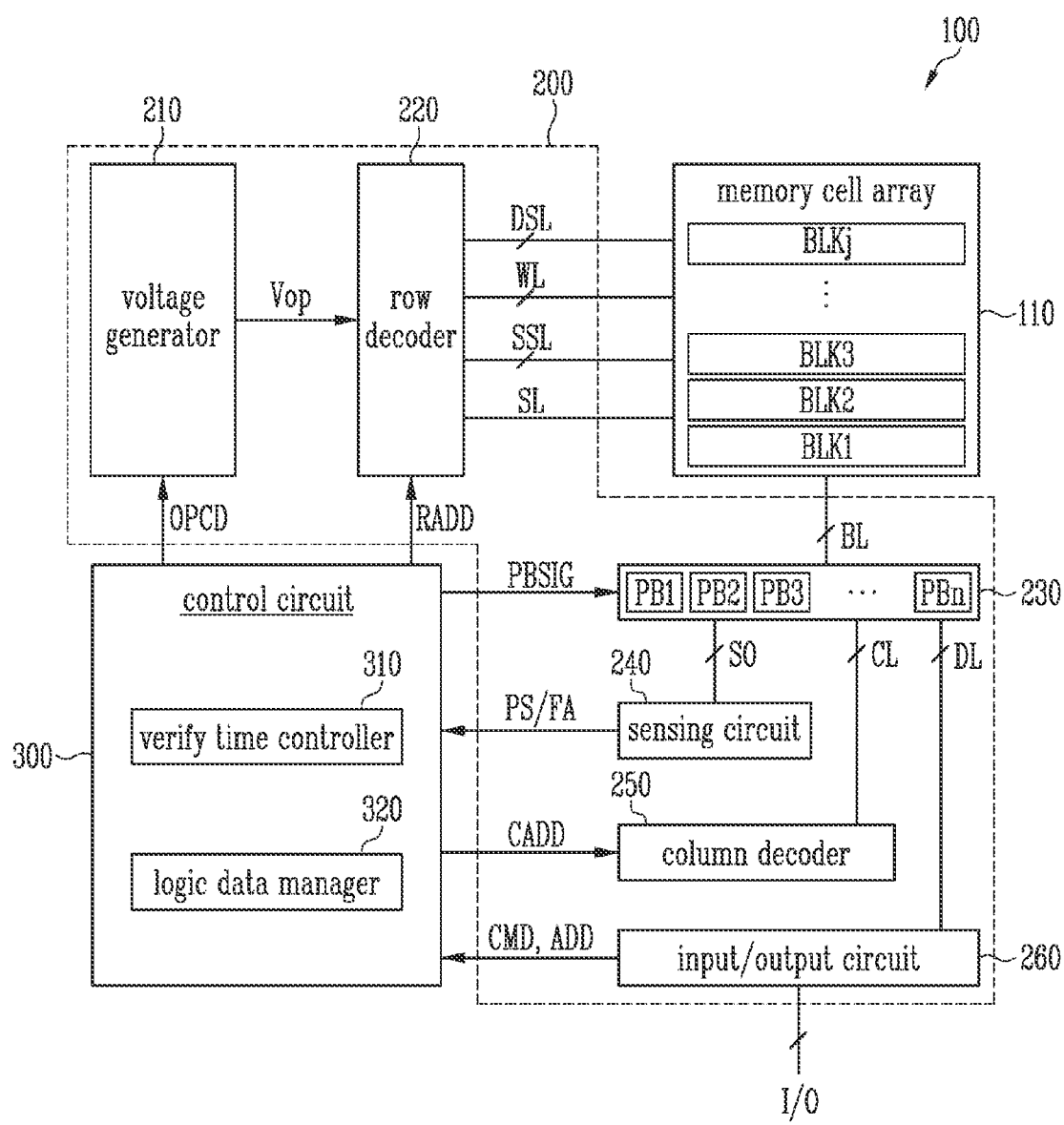
FIG. 1 is a diagram illustrating a memory device according to an embodiment of the present disclosure.

FIG. 1 is a diagram illustrating a memory device according to an embodiment of the present disclosure.

Referring to FIG. 1, the memory device 100 may include a memory cell array 110, a peripheral circuit 200, and a control circuit 300.

The memory cell array 110 may include first to j-th memory blocks BLK1 to BLKj. Each of the first to j-th memory blocks BLK1 to BLKj may include memory cells capable of storing data. The memory blocks may be formed in a three-dimensional structure. Drain select lines DSL, word lines WL, source select lines SSL, and a source line SL may be connected to each of the first to j-th memory blocks BLK1 to BLKj, and a bit line BL may be commonly connected to the first to j-th memory blocks BLK1 to BLKj.

The first to j-th memory blocks BLK1 to BLKj may be formed in a two-dimensional structure or a three-dimensional structure. The memory blocks having the two-dimensional structure may include memory cells arranged parallel to a substrate. The memory blocks having a three-dimensional structure may include memory cells stacked on a substrate in a vertical direction.

The memory cells may store 1 bit or 2 bits or more of data according to a program method. For example, a method in which 1 bit of data is stored in one memory cell is referred to as a single level cell method, and a method in which 2 bits of data is stored in one memory cell is referred to as a multi-level cell (MLC) method. A method in which 3 bits of data is stored in one memory cell is referred to as a triple level cell (TLC) method, and a method in which 4 bits of data is stored in one memory cell is referred to as a quad level cell (QLC) method. In addition to this, five bits or more of data may be stored in one memory cell. Each of bits of data may be defined as logical page data. Taking the TLC method as an example, memory cells may be programmed to have different threshold voltages according to different logic data.

The peripheral circuit 200 may be configured to perform a program operation of storing data in the memory cell array 110, a read operation of outputting the data stored in the memory cell array 110, and an erase operation of erasing the data stored in the memory cell array 110. For example, the peripheral circuit 200 may include a voltage generator 210, a row decoder 220, a page buffer group 230, a sensing circuit 240, a column decoder 250, and an input/output circuit 260.

The voltage generator 210 may generate various operation voltages Vop used for the program operation, the read operation, or the erase operation in response to an operation code OPCD. For example, the voltage generator 210 may be configured to generate program voltages, turn-on voltages, turn-off voltages, negative voltages, precharge voltages, verify voltages, read voltages, pass voltages, or erase voltages in response to the operation code OPCD. The operation voltages Vop generated by the voltage generator 210 may be applied to the drain select lines DSL, the word lines WL, the source select lines SSL, and the source line SL of memory block selected through the row decoder 220.

The program voltages may be voltages applied to a selected word line among the word lines WL during the program operation, and may be used to increase a threshold voltage of memory cells connected to the selected word line. The turn-on voltages may be applied to the drain select lines DSL or the source select lines SSL, and may be used to turn on drain select transistors or source select transistors. The turn-off voltages may be applied to the drain select lines DSL or the source select lines SSL, and may be used to turn off the drain select transistors or the source select transistors. The precharge voltages may be a voltage higher than 0V, and may be applied to bit lines during the read operation. The verify voltages may be used during a verify operation for determining whether a threshold voltage of selected memory cells is increased to a target level. The verify voltages may be set to various levels according to the target level.

The read voltages may be applied to the selected word line during the read operation of the selected memory cells. For example, the read voltages may be set to various levels according to a program method of the selected memory cells.

The pass voltages may be voltages applied to unselected word lines among the word lines WL during the program or read operation, and may be used to turn on memory cells connected to the unselected word lines. In the read operation according to the present embodiment, the pass voltages may include target pass voltages set to the highest and sub pass voltages lower than the target pass voltages. For example, before the read voltage is applied to the selected word line, the sub pass voltages may be applied to word lines adjacent to the selected word line. When the sub pass voltages are applied to adjacent word lines, the target pass voltages may be applied to remaining unselected word lines. When the read voltage is applied to the selected word line, the target pass voltages may be applied to adjacent word lines. The erase voltages may be used during the erase operation for erasing memory cells included in the selected memory block, and may be applied to the source line SL.

The row decoder 220 may be configured to transmit the operation voltages Vop to the drain select lines DSL, the word lines WL, the source select lines SSL, and the source line SL connected to the selected memory block, according to a row address RADD. For example, the row decoder 220 may be connected to the voltage generator 210 through global lines, and may be connected to the first to j-th memory blocks BLK1 to BLKj through the drain select lines DSL, the word lines WL, the source select lines SSL, and the source line SL.

The page buffer group 230 may include first to n-th page buffers PB1 to PBn connected to the first to j-th memory blocks BLK1 to BLKj. Each of the first to n-th page buffers PB1 to PBn may be connected to the first to j-th memory blocks BLK1 to BLKj through the bit lines BL. During the read operation, the first to n-th page buffers PB1 to PBn may sense a current or a voltage of the bit lines which varies according to threshold voltages of the selected memory cells, and store the sensed data, in response to page buffer control signals PBSIG.

In a verify step of the program operation, the sensing circuit 240 may be configured to selectively output a pass signal PS or a fail signal FA according to a voltage or a current of sensing nodes SO included in the first to n-th page buffers PB1 to PBn. For example, in the verify step, the sensing circuit 240 may output the fail signal FA when the voltage of the sensing nodes SO is lower than a reference voltage, and output the pass signal PS when the voltage of the sensing nodes SO is higher than the reference voltage.

The column decoder 250 may be configured so that data is transmitted between the page buffer group 230 and the input/output circuit 260 in response to a column address CADD. For example, the column decoder 250 may be connected to the page buffer group 230 through column lines CL and may transmit transmission enable signals to the page buffers through the column lines CL. The first to n-th page buffers PB1 to PBn included in the page buffer group 230 may receive or output the data through data lines DL in response to the transmission enable signals.

The input/output circuit 260 may be configured to receive or output a command CMD, an address ADD, or data through input/output lines I/O. For example, the input/output circuit 260 may transmit the command CMD and the address ADD received from an external controller to the control circuit 300 through the input/output lines I/O, and transmit the data received from the external controller to the page buffer group 230 through the input/output lines I/O. Alternatively, the input/output circuit 260 may output the data received from the page buffer group 230 to the external controller through the input/output lines I/O.

The control circuit 300 may include software of hardware configured to output the operation code OPCD, the row address RADD, the page buffer control signals PBSIG, and the column address CADD in response to the command CMD and the address ADD. For example, when the command CMD input to the control circuit 300 is a command corresponding to the program operation, the control circuit 300 may control the peripheral circuit 200 to perform the program operation of a selected memory block by executing a program algorithm in response to the command CMD. For example, the control circuit 300 may perform the program operation using logic data. The logic data may be data received from an external device (for example, a controller) or data obtained by transforming the data received from the external device.

When the command CMD input to the control circuit 300 is a command corresponding to the read operation, the control circuit 300 may control the peripheral circuit 200 to perform the read operation of the selected memory block and output the read data by executing a read algorithm. When the command CMD input to the control circuit 300 is a command corresponding to the erase operation, the control circuit 300 may control the peripheral circuit 200 to perform the erase operation of the selected memory block by executing an erase algorithm.

The control circuit 300 according to the present embodiment may include a verify time controller 310 that adjusts a time of the verify operation, and a logic data manager 320 that designates new logic data to cells detected in the verify operation. For example, in the verify operation according to the present embodiment, the verify time controller 310 may separate a threshold voltage of programmed memory cells into at least two or more threshold voltages by adjusting a verify time. For example, among memory cells included in a selected page, memory cells of which a threshold voltage decreases relatively slowly may be detected as high-level cells, and memory cells of which a threshold voltage decreases relatively quickly may be detected as low-level cells. For example, a verify operation for detecting the low-level cell may be performed on memory cells connected to even bit lines among the bit lines BL, and a verify operation for detecting the high-level cell may be performed on memory cells connected to odd bit lines among the bit lines BL. In addition to this, bit lines for detecting the low-level cell and the high-level cell may be divided in various methods.

Accordingly, the peripheral circuit 200 operating under control of the control circuit 300 may switch cells detected as the low-level cells into unselected memory cells while the program operation of the selected memory cells is performed.

The logic data manager 320 may assign new logic data to cells detected in the verify operation. For example, the new logic data may have more bits than logic data used during the program operation.

Figure 2:
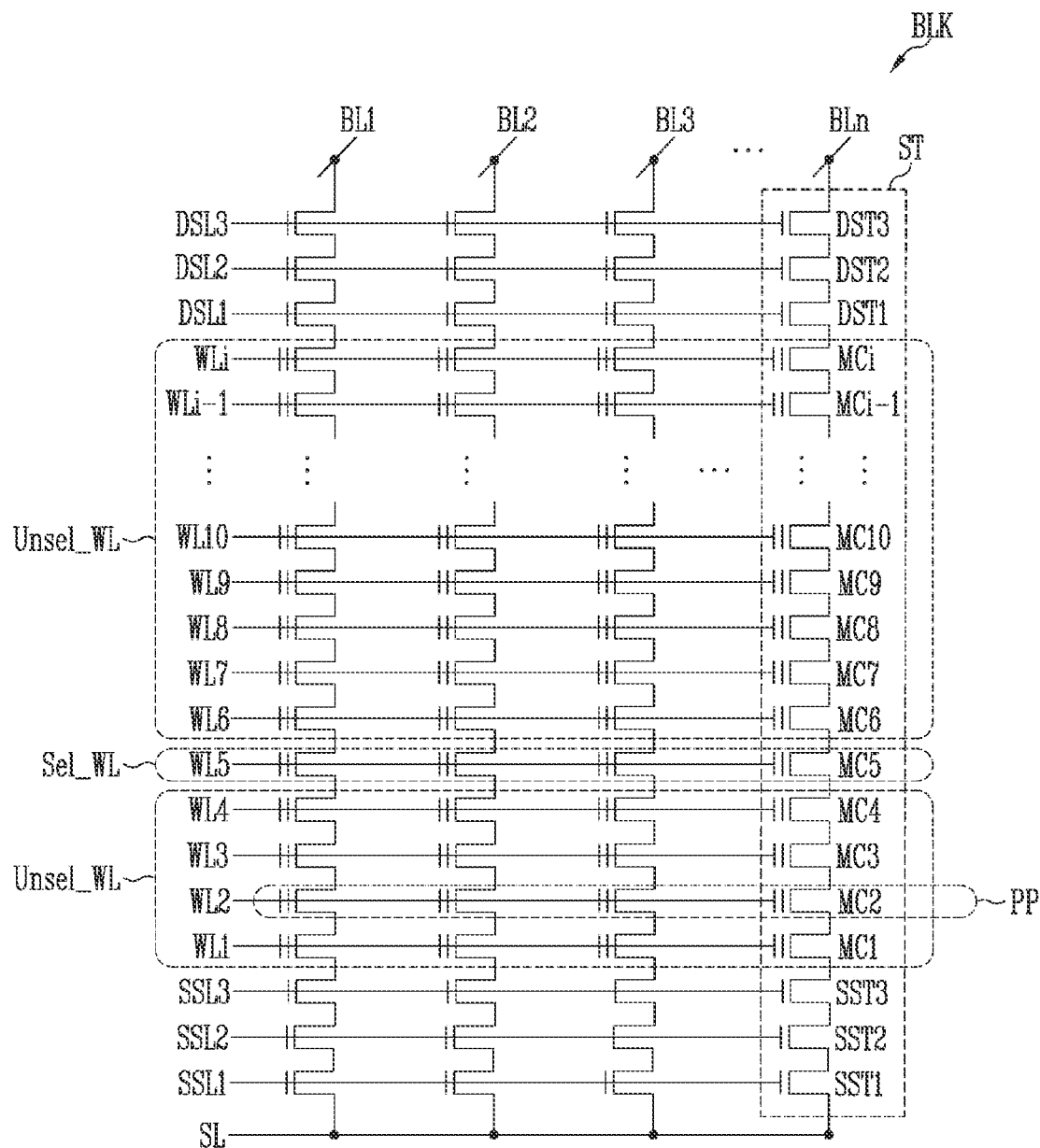
FIG. 2 is a diagram illustrating a memory block according to an embodiment of the present disclosure.

FIG. 2 is a diagram illustrating a memory block according to an embodiment of the present disclosure.

Referring to FIG. 2, the memory block BLK may be any one of the first to j-th memory blocks BLK1 to BLKj shown in FIG. 1. The memory block BLK may include cell strings ST connected between the first to n-th bit lines BL1 to BLn and the source line SL. Each of the cell strings ST may be connected to each of the first to n-th bit lines BL1 to BLn and may be commonly connected to the source line SL.

Because the cell strings ST are configured identically to each other, the cell string ST connected to the n-th bit line BLn is described as an example as follows.

The cell string ST may include first to third source select transistors SST1 to SST3 connected in series between the source line SL and the n-th bit line BLn, first to i-th memory cells MC1 to MCi, and first to third drain select transistors DST1 to DST3. Although not shown in the drawing, dummy cells may be further included. Because FIG. 2 is an example illustrating a configuration of the memory block BLK, the number of select transistors, memory cells, and drain select transistors is not limited to the number shown in FIG. 2.

The first to third source select transistors SST1 to SST3 may electrically connect or disconnect between the source line SL and the first memory cell MC1, the first to i-th memory cells MC1 to MCi may store data, and the first to third drain select transistors DST1 to DST3 may electrically connect or disconnect the i-th memory cell MCi and the n-th bit line BLn.

Gates of the first to third source select transistors SST1 to SST3 included in different cell strings ST may be connected to the first to third source select lines SSL1 to SSL3. Gates of the first to i-th memory cells MC1 to MCi included in different cell strings ST may be connected to first to i-th word lines WL1 to WLi. Gates of the first to third drain select transistors DST1 to DST3 included in different cell strings ST may be connected to first to third drain select lines DSL1 to DSL3.

A group of memory cells connected to the same word line among the memory cells becomes a physical page PP. For example, the second memory cells MC2 connected to the second word line WL2 may configure one physical page PP. The program operation and the read operation may be performed in a physical page unit, and the erase operation may be performed in a memory block unit.

Because the program operation is performed in a page unit, one word line among the first to i-th word lines WL1 to WLi may become a selected word line Sel_WL and the remaining word lines may become unselected word lines Unsel_WL. During the program operation, the program voltage or the verify voltage may be applied to the selected word line Sel_WL, and the pass voltage may be applied to the unselected word lines Unsel_WL. During the program operation, a turn-on voltage of a positive voltage may be applied to the first to third source select lines SSL1 to SSL3 and the first to third drain select lines DSL1 to DSL3. During the program operation, a program allowable voltage may be applied to selected bit lines among the first to n-th bit lines BL1 to BLn, and a program inhibit voltage may be applied to unselected bit lines. The program allowable voltage may be set to 0V or a negative voltage, and the program inhibit voltage may be set to a precharge voltage or power voltage of a positive voltage.

Figure 3:
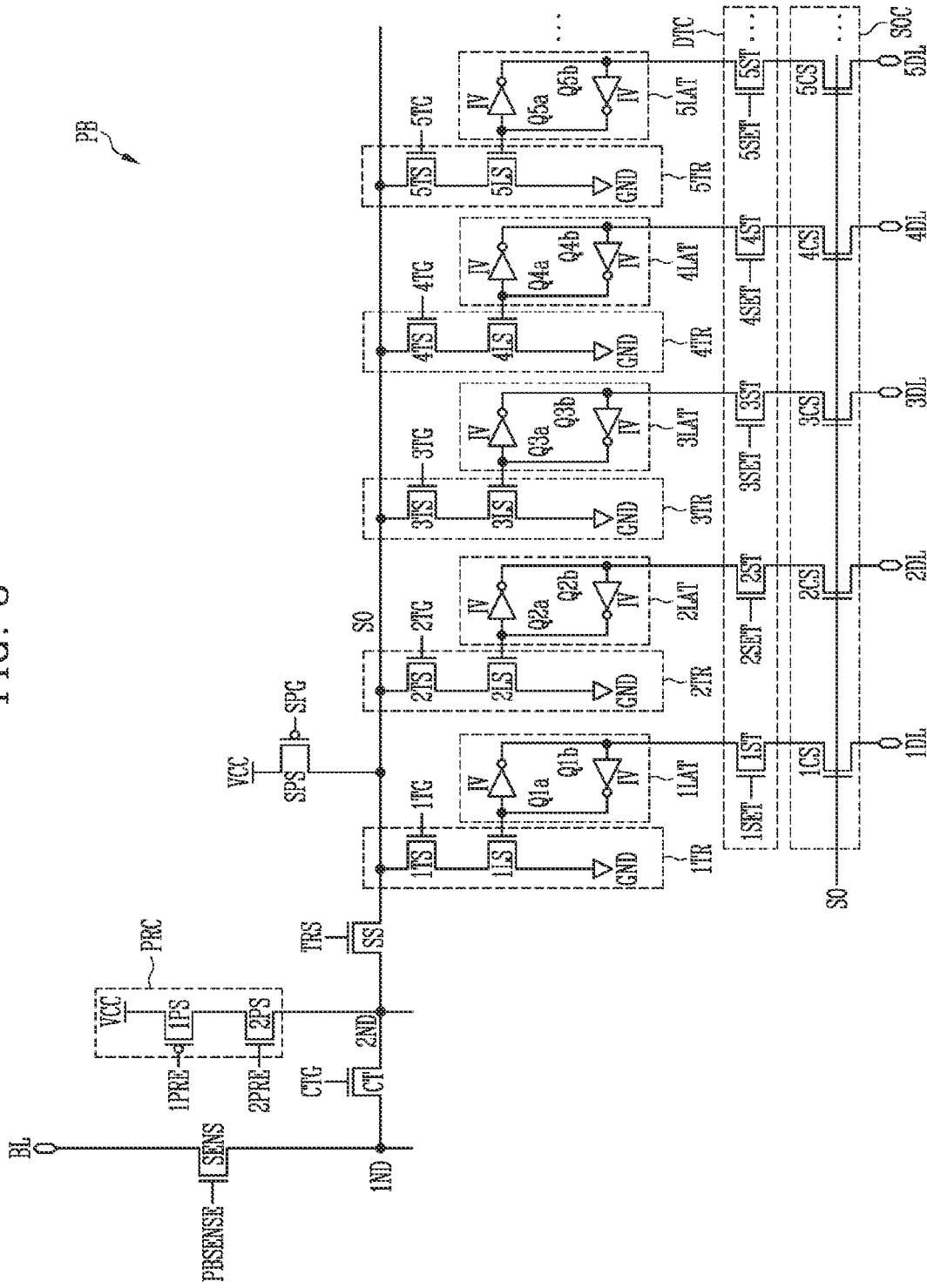
FIG. 3 is a circuit diagram illustrating a page buffer according to an embodiment of the present disclosure.

FIG. 3 is a circuit diagram illustrating a page buffer according to an embodiment of the present disclosure.

Referring to FIG. 3, the page buffer PB may be any one of the first to n-th page buffers PB1 to PBn shown in FIG. 1.

The page buffer PB may include a sensing switch SENS, a common transmission switch CT, a bit line precharge circuit PRC, a select switch SS, a sensing node precharge switch SPS, first to fifth latches 1LAT to 5LAT, first to fifth transmission circuits 1TR to 5TR, a data transmission circuit DTC, and a sensing node connection circuit SOC. Signals for operating switches and circuits included in the page buffer PB may be included in the page buffer control signals PBSIG of FIG. 1.

The sensing switch SENS may be implemented with an NMOS transistor connecting or disconnecting a first node 1ND of the page buffer PB and the bit line BL in response to a sensing signal PBSENSE. The common transmission switch CT may be implemented with an NMOS transistor connected between the first node 1ND and a second node 2ND of the page buffer PB and turned on or turned off in response to a common transmission signal CTG. During the verify operation, the common transmission switch CT may be turned on in response to a common transmission signal CTG of a positive voltage, and thus the first and second nodes 1ND and 2ND may be connected to each other.

The bit line precharge circuit PRC may include first and second bit line precharge switches 1PS and 2PS connected in series between a terminal to which a power voltage VCC is applied and the second node 2ND. The first bit line precharge switch 1PS may be connected between the terminal to which the power voltage VCC is applied and the second bit line precharge switch 2PS, and may be implemented with a PMOS transistor turned on or off in response to a first bit line precharge signal 1PRE. The second bit line precharge switch 2PS may be connected between the first bit line precharge switch 1PS and the second node 2ND, and may be implemented with an NMOS transistor turned on or off in response to a second bit line precharge signal 2PRE. During the verify operation, when the first bit line precharge signal 1PRE of 0V or a negative voltage is applied to the first bit line precharge switch 1PS, and the second bit line precharge signal 2PRE of a positive voltage is applied to the second bit line precharge switch 2PS, the power voltage VCC may be supplied to the second node 2ND.

The select switch SS may be implemented with an NMOS transistor turned on or off in response to a select signal TRS. While the verify operation is performed, the select switch SS may be maintained as a turn on state to reflect the voltage or the current of the bit line BL to the sensing node SO.

The sensing node precharge switch SPS may be connected between the terminal to which the power voltage VCC is applied and the sensing node SO to precharge the sensing node SO with a positive voltage during the verify operation. The sensing node precharge switch SPS may be implemented with a PMOS transistor turned on or off in response to a sensing node precharge signal SPG. For example, the sensing node precharge switch SPS may be turned on in response to the sensing node precharge signal SPG of 0V or a negative voltage.

The first to fifth latches 1LAT to 5LAT may be configured to store the logic data and select data, and the first to fifth transmission circuits 1TR to 5TR may be configured to selectively transmit data input to the first to fifth latches 1LAT to 5LAT to the sensing node SO or to selectively transmit data of the sensing node SO to the first to fifth latches 1LAT to 5LAT. The number of latches and transmission circuits included in the page buffer PB may vary according to a program method of the memory device. For example, in a memory device in which the program operation is performed in a QLC method in which 4 bits of data is stored in one memory cell, at least four latches and transmission circuits may be included in the page buffer PB to respectively store logic data corresponding to 4 bits. The logic data may be data programmed into or output from the memory device, and may be different from data received from an external device (for example, a controller) of the memory device. For example, during the program operation, when data is received from the controller, which is the external device, the memory device may convert the received data into the logic data that may be used inside the memory device, and perform the program operation using the converted data.

In the present embodiment, in addition to the logic data used during the program operation, the select data used to separate a threshold voltage during the verify operation may be used. Therefore, in the present embodiment, a latch and a transmission circuit for respectively storing the logic data and the select data may be added.

Five latches and transmission circuits are shown in the page buffer PB shown in FIG. 3. Taking a program operation of a TLC method as an example, least significant bit (LSB), center significant bit (CSB), and most significant bit (MSB) data may be stored in third to fifth latches 3LAT to 5LAT, and different select data may be stored in first and second latches 1LAT and 2LAT.

Each of first to fifth transmission circuits 1TR to 5TR may be connected between the sensing node SO and a ground terminal GND, and may operate in response to the data input to the first to fifth latches 1LAT to 5LAT and first to fifth transmission signals 1TG to 5TG. The first to fifth transmission circuits 1TR to 5TR may be configured identically to each other, and the first to fifth latches 1LAT to 5LAT may also be configured identically to each other.

The first to fifth latches 1LAT to 5LAT may be configured to store logic data to be programmed, and the first to fifth transmission circuits 1TR to 5TR may be configured to selectively transmit the data input to the first to fifth latches 1LAT to 5LAT to the sensing node SO or selectively transmit data of the sensing node SO to the first to fifth latches 1LAT to 5LAT.

In the present embodiment, the number of latches and transmission circuits included in the page buffer PB may vary according to a program method of the memory device. For example, in a memory device in which the program operation is performed in a TLC method in which 3 bits of data is stored in one memory cell, at least three latches and transmission circuits may be included in the page buffer PB to respectively store logic data corresponding to 3 bits. In the present embodiment, because the select data as well as the logic data are added, a latch and a transmission circuit for storing the select data may be added. As an embodiment, different select data may be stored in the first and second latches 1LAT and 2LAT among the first to fifth latches 1LAT to 5LAT shown in FIG. 3, and the logic data may be stored in the third to fifth latches 3LAT to 5LAT. For example, the LSB data may be stored in the third latch 3LAT, the CSB data may be stored in the fourth latch 4LAT, and the MSB data may be stored in the fifth latch 5LAT. The logic data including the LSB, the CSB, and the MSB data is stored in the third to fifth latches 3LAT to 5LAT, but latches in which the LSB, the CSB, and the MSB data are stored may be changed.

Each of the first to fifth transmission circuits 1TR to 5TR may be connected between the sensing node SO and the ground terminal GND, and may operate in response to the data input to the first to fifth latches 1LAT to 5LAT and the first to fifth transmission signals 1TG to 5TG. Because the first to fifth transmission circuits 1TR to 5TR are configured identically to each other and the first to fifth latches 1LAT to 5LAT are also configured identically to each other, the first latch 1LAT and the first transmission circuit 1TR is described as an example as follows.

The first latch 1LAT may include inverters connected in parallel between a main node Q1$a$ and a sub node Q1$b$, and first select data may be input to the main node Q1$a$. Therefore, second select data may be input to a main node Q2$a$ of the second latch 2LAT, the LSB data may be input to a main node Q3$a$ of the third latch 3LAT, the CSB data may be input to a main node Q4$a$ of the fourth latch 4LAT, and the MSB data may be input to a main node Q5$a$ of the fifth latch 5LAT.

The first transmission circuit 1TR may include a first transmission switch 1TS and a first latch switch 1LS connected in series between the sensing node SO and the ground terminal GND. The first transmission switch 1TS may be implemented with an NMOS transistor connected between the sensing node SO and the first latch switch 1LS and turned on or off in response to the first transmission signal 1TG. The first latch switch 1LS may be implemented with an NMOS transistor connected between the first transmission switch 1TS and the ground terminal GND and turned on or off in response to data input to the main node Q1$a$ of the first latch 1LAT.

The first to fifth latches 1LAT to 5LAT may be connected to first to fifth data lines 1DL to 5DL through the data transmission circuit DTC and the sensing node connection circuit SOC.

The data transmission circuit DTC may include first to fifth setup switches 1ST to 5ST connected to sub nodes Q1$b$ to Q5$b$ of the first to fifth latches 1LAT to 5LAT. The first to fifth setup switches 1ST to 5ST may be implemented with an NMOS transistor turned on or off in response to first to fifth setup signals 1SET to 5SET. For example, the first to fifth setup signals 1SET to 5SET having a positive voltage may be simultaneously applied or selectively applied to the first to fifth setup switches 1ST to 5ST. The first to fifth setup signals 1SET to 5SET may be controlled by the verify time controller 310 of FIG. 1.

The sensing node connection circuit SOC may include first to fifth common switches 1CS to 5CS connected between the first to fifth setup switches 1ST to 5ST of the data transmission circuit DTC and the first to fifth data lines 1DL to 5DL. Gates of the first to fifth common switches 1CS to 5CS may be commonly connected to the sensing node SO. Therefore, the first to fifth common switches 1CS to 5CS may be implemented with NMOS transistors simultaneously turned on or off in response to the voltage of the sensing node SO. The words "simultaneous" and "simultaneously" as used herein with respect to processes mean that the processes take place on overlapping intervals of time. For example, if a first process takes place over a first interval of time and a second process takes place simultaneously over a second interval of time, then the first and second intervals at least partially overlap each other such that there exists a time at which the first and second processes are both taking place.

Figures 4A, 4B:
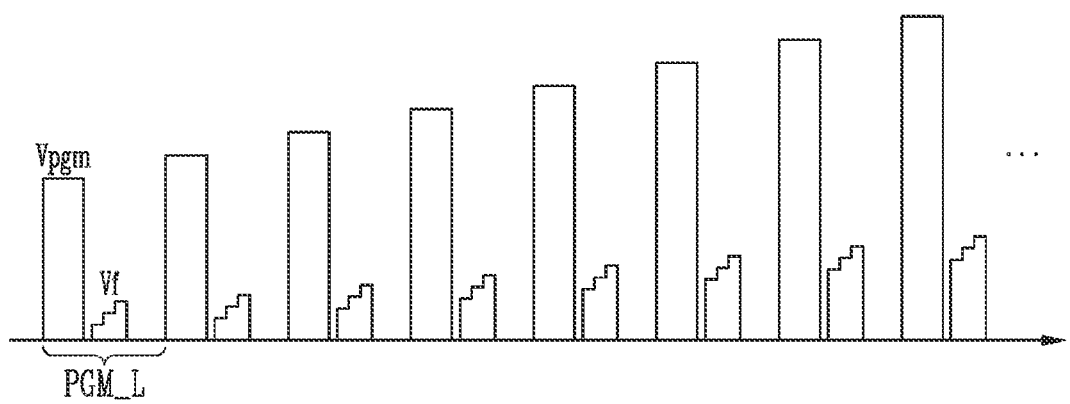
FIGS. 4A and 4B are diagrams illustrating an embodiment of a program operation of an incremental step pulse program (ISPP) method.

FIGS. 4A and 4B are diagrams illustrating an embodiment of a program operation of an incremental step pulse program (ISPP) method.

Referring to FIG. 4A, in the program operation of the ISPP method, a program voltage Vpgm applied to the selected word line may gradually increase. For example, a plurality of program loops PGM_L may be performed until a threshold voltage of the selected memory cells included in the selected page increase to a target voltage. The program voltage Vpgm may increase gradually whenever the number of program loops increases. A program voltage apply operation and a verify operation may be performed in one program loop PGM_L. In the program voltage apply operation, the program voltage Vpgm may be applied to the selected word line, and thus the threshold voltage of the selected memory cells may increase. In the verify operation, a verify voltage Vf may be applied to the selected word line, and thus it may be determined whether the threshold voltage of the selected memory cells increases to the target voltage. The verify voltage may vary according to the target voltage of the selected memory cells. When 2 bits or more of data are stored in one memory cell, a plurality of verify voltages Vf may be used in a verify step of the program loop PGM_L. For example, in the program loop PGM_L, the verify voltages Vf may gradually increase. As the number of program loops PGM_L increases, the verify voltages Vf may increase. The number and level of the verify voltages Vf used in the verify step of the program loop PGM_L may be changed according to a result of the verify step performed in a previous program loop PGM_L.

Referring to FIG. 4B, in each of the program loops PGM_L, the verify voltages Vf may gradually decrease, and as the number of program loops PGM_L increases, the verify voltages Vf may increase. The number, level, and verify time of the verify voltages Vf used in the verify operation of the program loop PGM_L may be determined according to the number of bits of the logic data input to the page buffer during the program operation.

Figure 5:
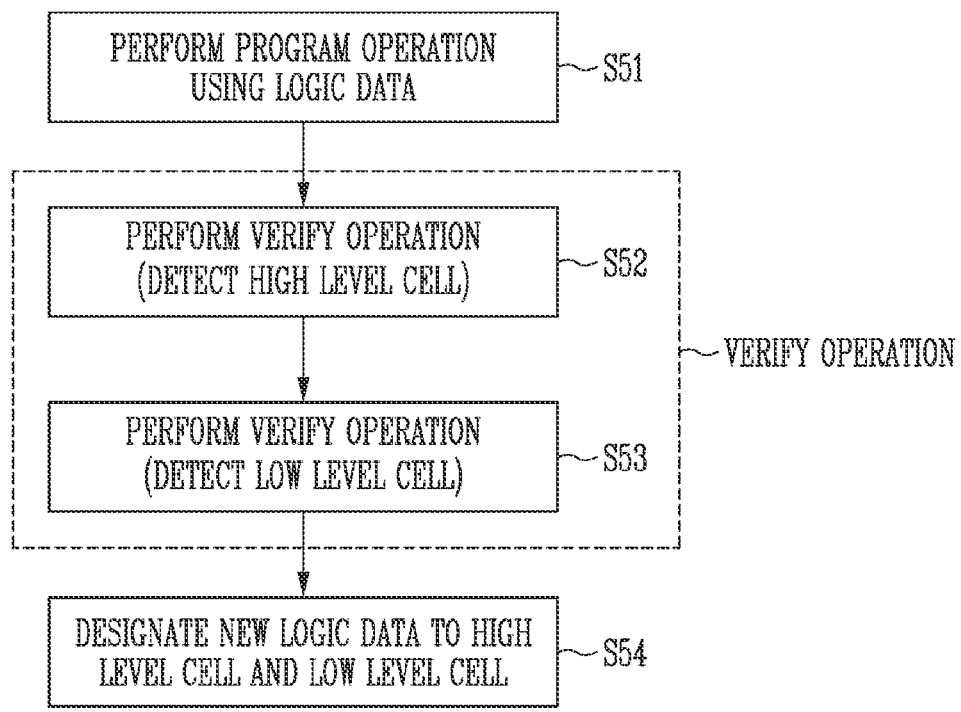
FIG. 5 is a diagram illustrating a program operation according to an embodiment of the present disclosure.

FIG. 5 is a diagram illustrating a program operation according to an embodiment of the present disclosure.

Referring to FIG. 5, when the program operation is started, the logic data and the select data may be input to the page buffer, and during the verify operation, the logic data may be changed to the new logic data and stored in the memory block. The number of bits included in the new logic data is greater than the number of bits included in the logic data. The program operation according to a present embodiment is described in detail as follows.

When the program operation is started, the memory device may perform the program operation using the logic data (S51). The memory device may set the verify voltage and the verify time according to the number of bits of the logic data. The memory device may increase the threshold voltage of the selected memory cells by inputting the logic data to the page buffer and applying the program voltage to the selected word line among the word lines connected to the memory block.

When the program voltage is applied to the selected word line during a predetermined time, the memory device may perform the verify operation. During the verify operation, the verify operation of detecting the high-level cell (S52) and the verify operation (S53) of detecting the low-level cell may be sequentially performed within the verify time set in step S51. The word "predetermined" as used herein with respect to a parameter, such as a predetermined time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The verify voltage used during the verify operation may be determined according to the number of bits of the logic data. For example, when the logic data is configured of 3 bits of data, because the program operation is performed in a TLC method, verify voltages set in the program operation of the TLC method may be used. In the program operation of the TLC method, the memory cells may have eight threshold voltage distributions including an erase state and a program state. Seven verify voltages may be used to distinguish the eight threshold voltage distributions. Assuming that first to seventh verify voltages are used in the verify operation of the entire program operation performed on the selected page, steps S52 and S53 may be performed using one verify voltage. For example, in the verify operation using the first verify voltage, the high-level cell and the low-level cell may be sequentially detected. The high-level cell and the low-level cell may be classified according to the threshold voltage of the memory cells. For example, the high-level cell may be a fast cell of which a program speed is higher than that of the low-level cell, and the low-level cell may be a slow cell of which a program speed is lower than that of the high-level cell. The low-level cell may have a threshold voltage lower than the verify voltage, and the high-level cell may have a threshold voltage higher than the verify voltage. Therefore, a threshold voltage of the high-level cell may be higher than a threshold voltage of the low-level cell. Because the high-level cell and the low-level cell may be detected in the verify operation using one verify voltage, 16 threshold voltages corresponding to twice eight threshold voltages may be detected when seven verify voltages are used. Here, the eight threshold voltages are used in a general verify operation using seven verify voltages.

After the verify operation including steps S52 and S53 is performed during the verify time, the logic data manager 320 of FIG. 1 may designate the new logic data to the high-level cell and the low-level cell detected in steps S52 and S53 (S54).

Figure 6A:
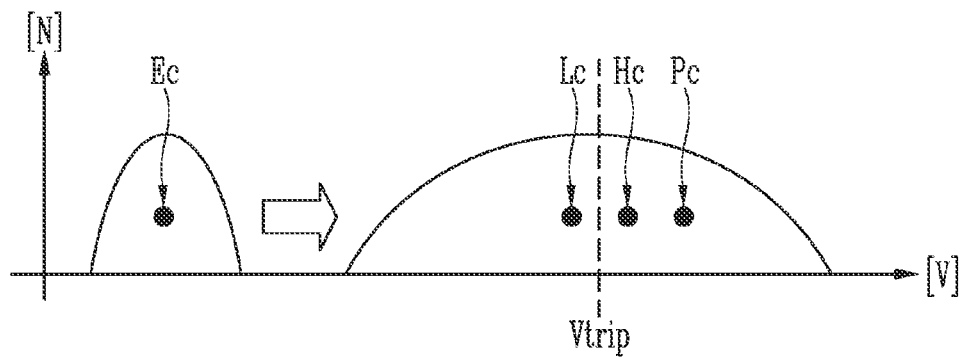
FIGS. 6A, 6B, and 6C are diagrams illustrating a verify operation according to an embodiment of the present disclosure.
Figure 6B:
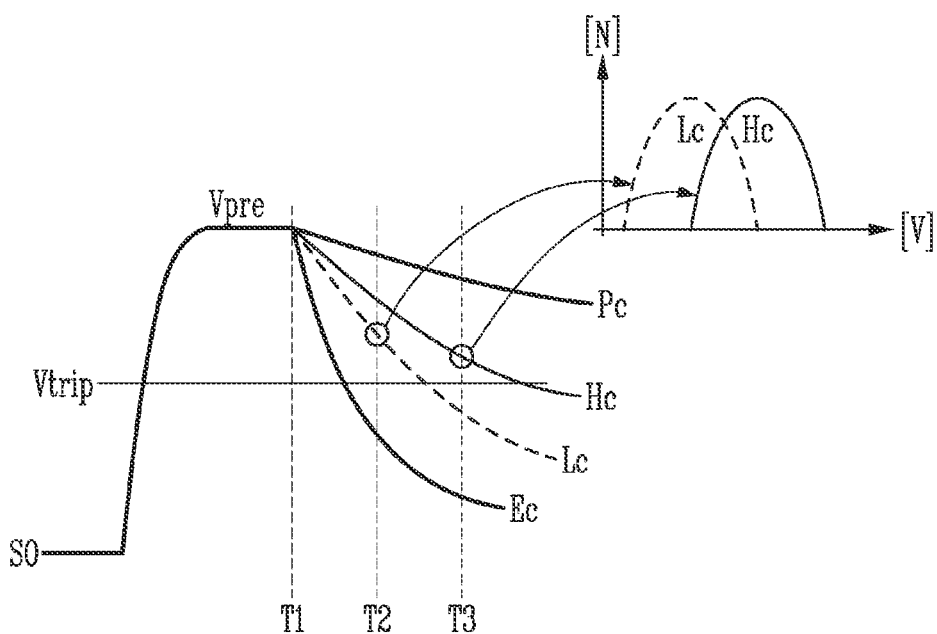
Figure 6C:
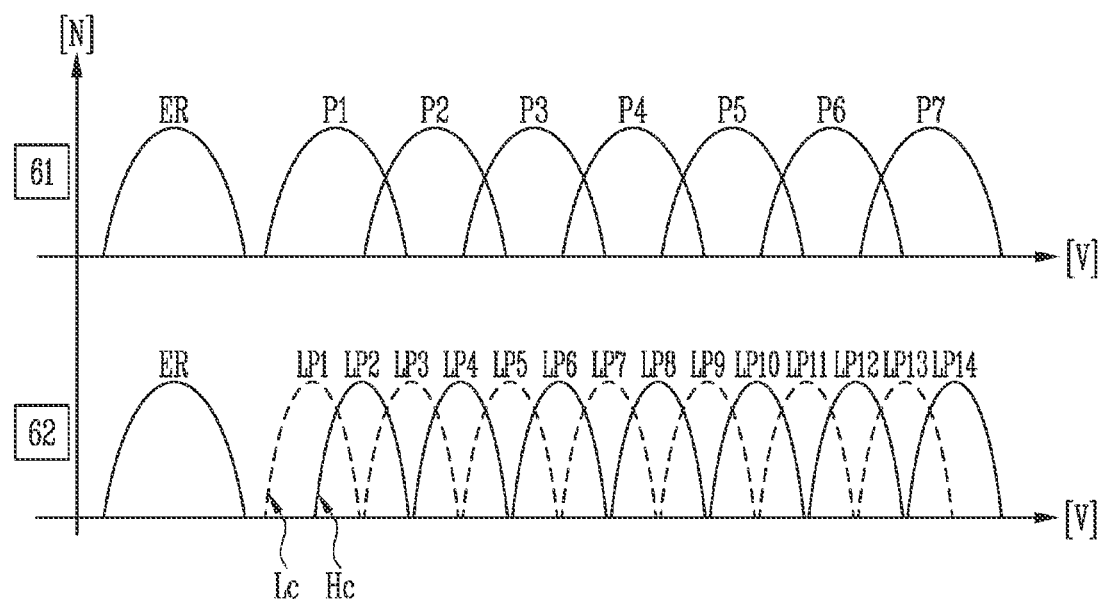

FIGS. 6A to 6C are diagrams illustrating a verify operation according to an embodiment of the present disclosure.

Referring to FIG. 6A, when the program voltage is applied to erased cells Ec which are in the erase state during the program operation, the threshold voltage of the memory cells increase due to the program voltage. Because electrical characteristics of the memory cells are different from each other, a difference in a speed at which the threshold voltage is increased by the same program voltage may exist. For example, among the plurality of memory cells, a cell of which a program speed is higher than that of a reference cell may be a fast cell, and a cell of which a program speed is lower than that of the reference cell may be a slow cell. Because the reference cell might not be a specific cell but may be any one of comparison object cells, the reference cell may be changed according to the comparison object cells.

A cell of which a threshold voltage higher than a reference voltage Vtrip among cells of which a threshold voltage is increased may be defined as a programmed cell Pc or a high-level cell Hc. A cell of which a threshold voltage is lower than the reference voltage Vtrip may be defined as a low-level cell Lc or an erased cell Ec. In FIG. 6A, a horizontal axis represents a voltage V, and a vertical axis represents the number N of memory cells.

Referring to FIGS. 6A and 6B, the verify operation may be performed after the threshold voltage of the memory cells is increased by the program voltage. During the verify operation, a state of the memory cells may be determined according to the voltage of the precharged sensing node SO. For example, during the verify operation, a precharge voltage Vpre of a positive voltage may be applied to the bit line and the sensing node, and thus the bit line and the sensing node may be precharged. Subsequently, when the verify voltage is applied to the selected word line, because the memory cell having the threshold voltage lower than the verify voltage is turned on, a voltage of a bit line connected to the turned-on memory cell may be decreased, and thus the voltage of the sensing node SO electrically connected to the bit line may also be decreased. Because the memory cells having the threshold voltage higher than the verify voltage are the high-level cells Hc or the programmed cells Pc, the voltage of the sensing node SO electrically connected to the high-level cell Hc or the programmed cell Pc may be maintained as the precharge voltage Vpre or slightly may be decreased by leakage.

The voltage of the sensing node SO electrically connected to each of the low-level cell Lc and the erased cell Ec having the threshold voltage lower than the verify voltage may be decreased. At this time, a difference may occur in a speed at which the voltage of the sensing node SO is decreased according to a turn-on level of the memory cells. For example, a speed at which the threshold voltage of the low-level cell Lc is decreased may be higher than a speed at which the threshold voltage of the high-level cell Hc is decreased. A speed at which the threshold voltage of the erased cell Ec is decreased may be higher than a speed at which the threshold voltage of the low-level cell Lc is decreased. Therefore, between a first time T1 when an evaluation period of the verify operation is started and a third time T3 when the evaluation period is ended, the threshold voltages of the high-level cell Hc, the low-level cell Lc, and the erased cell Ec may be decreased at different speeds.

In a general verify operation, a state of the memory cells is determined based on an evaluation result of the third time T3 when the evaluation period is ended, but in the present embodiment, an evaluation for detecting the low-level cell Lc may be further performed at a second time T2 between the first time T1 and the third time T3. For example, because the threshold voltage of the low-level cell Lc may be decreased more slowly than the threshold voltage of the erased cell Ec and may be decreased faster than the threshold voltage of the high-level cell Hc, the low-level cell Lc may be determined as a cell having a threshold voltage higher than the reference voltage Vtrip at the second time T2. Because the low-level cell Lc detected as the cell having the threshold voltage higher than the reference voltage Vtrip at the second time T2 is determined as a cell on which program is completed, the low-level cell Lc may be excluded from an evaluation object at the third time T3. That is, even though the voltage of the sensing node SO of the cell determined as the low-level cell Lc at the second time T2 becomes lower than the reference voltage Vtrip at the third time T3, the low-level cell Lc is not determined as the erased cell. Because the threshold voltage of the high-level cell Hc may be decreased more slowly than the threshold voltage of the low-level cell Lc, the high-level cell Hc might not be determined at the second time T2 and may be determined as a cell on which program is completed at the third time T3.

Therefore, among the memory cells of which the threshold voltage is increased by the program voltage, some of the memory cells of which the threshold voltage is lower than the verify voltage may be determined as the low-level cells Lc, and the cells determined as the low-level cells Lc may be unselected while the program operation of the remaining memory cells is in progress. Therefore, the plurality of memory cells included in the selected page may have a threshold voltage distribution corresponding to the high-level cell Hc and a threshold voltage distribution corresponding to the low-level cell Lc.

Referring to FIGS. 6B and 6C, a threshold voltage distribution corresponding to reference numeral 61 is a threshold voltage distribution of the memory cells on which the evaluation operation is performed only at the third time T3, and a threshold voltage distribution corresponding to reference numeral 62 is a threshold voltage distribution of the memory cells on which the evaluation operation is performed at each of the second time T2 and the third time T3 according to the present embodiment.

When the evaluation operation is performed only at the third time T3 (61), the memory cells may be divided into an erase state ER or any one of first to seventh program states P1 to P7 according to the threshold voltage distribution.

When the evaluation operation is performed at each of the second time T2 and the third time T3 (62) as in the present embodiment, the memory cells may be divided into the erase state ER or any one of first to fourteenth logic program states LP1 to LP14 according to the threshold voltage distribution. For example, memory cells to be programmed to the first program state P1 may be divided into the first or second logic program state LP1 or LP2. Because the first logic program state LP1 is a state lower than the second logic program state LP2, the memory cells in the first logic program state LP1 may correspond to the low-level cell Lc, and the memory cells in the second logic program state LP2 may correspond to the high-level cell Hc.

Figure 7:
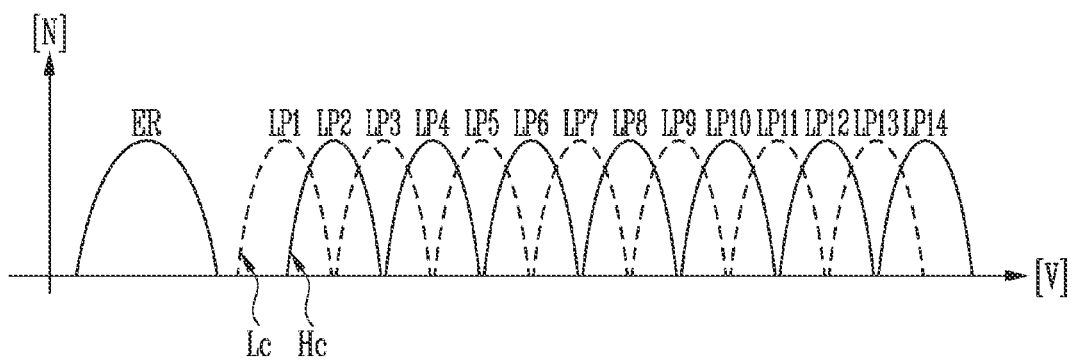
FIG. 7 is a diagram illustrating a verify operation according to a first embodiment of the present disclosure.

FIG. 7 is a diagram illustrating a verify operation according to a first embodiment of the present disclosure.

Referring to FIG. 7, when the logic data used for the program operation is configured of 3 bits of data, the logic data may include the MSB, CSB, and LSB data. Although the program operation is performed according to the logic data, memory cells configuring one threshold voltage distribution may be divided into the high-level cell Hc and the low-level cell Lc during the verify operation according to the present embodiment. Therefore, the memory cells on which the program operation is completed may be programmed to have more threshold voltage distributions than the number of threshold voltage distributions corresponding to the logic data.

In the first embodiment, because the unselected memory cells corresponding to the erase state ER are not programmed, the unselected memory cells may be maintained in the erase state ER while the selected memory cells are programmed. The memory cells to be programmed to the first program state according to the logic data may be programmed to the first logic program state LP1 and the second logic program state LP2. For example, the memory cells corresponding to the first logic program state LP1 may become the low-level cells Lc, and the memory cells corresponding to the second logic program state LP2 may become the high-level cells Hc. In such a method, memory cells to be programmed to the second to seventh program states according to the logic data may be programmed to the third to fourteenth logic program states LP3 to LP14.

Therefore, in the program operation according to the first embodiment, the memory cells may be maintained in the erase state ER or may be programmed to any one of the first to fourteenth logic program states LP1 to LP14.

Figure 8:
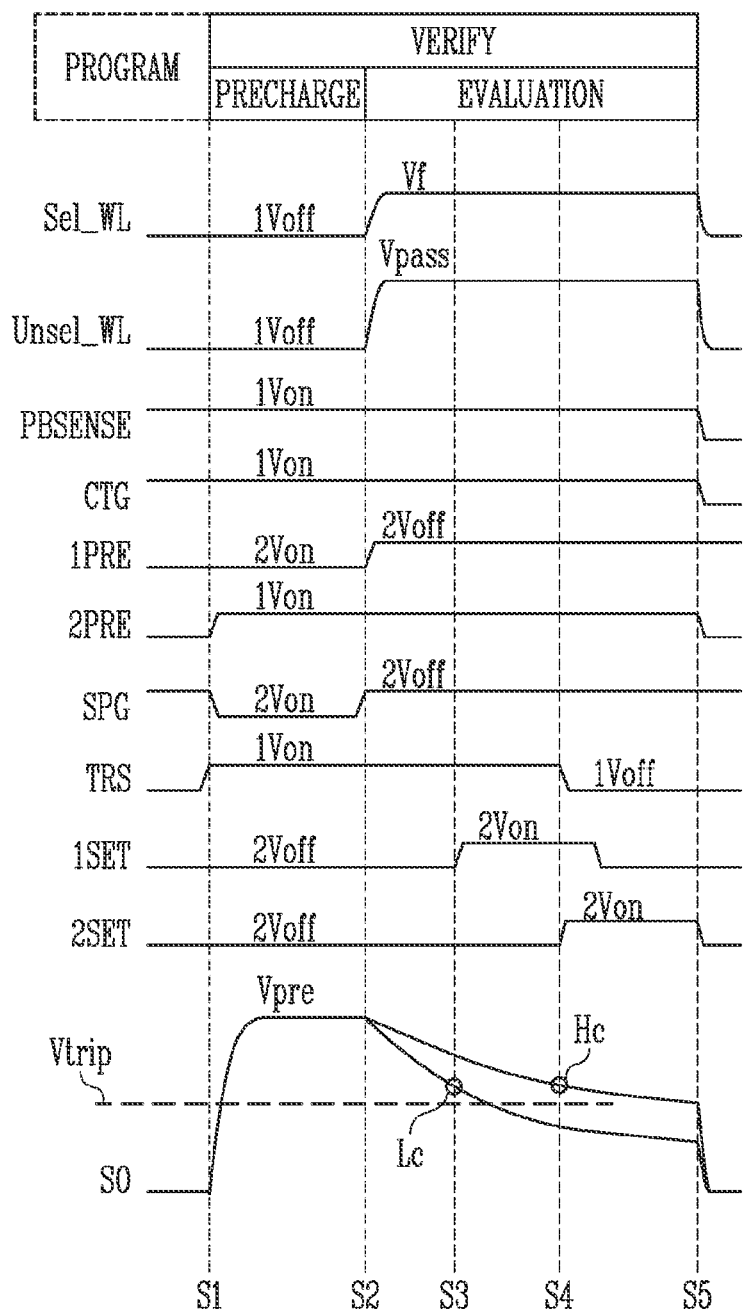
FIG. 8 is a timing diagram illustrating the verify operation according to the first embodiment of the present disclosure.

FIG. 8 is a timing diagram illustrating the verify operation according to the first embodiment of the present disclosure.

Referring to FIGS. 3 and 8, when a program step in which the program voltage is applied to the selected word line connected to the selected page is ended, the verify operation may be performed. The verify operation may include a precharge step and an evaluation step. The precharge step may be performed between a first time point S1 and a second time point S2, and the evaluation step may be performed between the second time point S2 and a fifth time point S5. It is assumed that select data of '1' is input to the first latch 1LAT, select data of '0' is input to the second latch 2LAT, and the logic data is input to the third to fifth latches 3LAT to 5LAT.

At the first time point S1, the sensing signal PBSENSE having a first turn-on voltage 1Von, the common transmission signal CTG, the second bit line precharge signal 2PRE, the select signal TRS, the first bit line precharge signal 1PRE having a second turn-on voltage 2Von, and the sensing node precharge signal SPG may be applied to the sensing switch SENS, the common transmission switch CT, the second bit line precharge switch 2PS, the select switch SS, the first bit line precharge switch 1PS, and the sensing node precharge switch SPS, respectively.

Because the sensing node precharge switch SPS is implemented with the PMOS transistor, the sensing node precharge signal SPG may be set to the second turn-on voltage 2Von lower than the first turn-on voltage 1Von. For example, the first turn-on voltage 1Von may be set to a positive voltage higher than 0V, and the second turn-on voltage 2Von may be set to 0V or a negative voltage lower than 0V. When the sensing node precharge switch SPS is turned on, the power voltage may be supplied to the sensing node SO, and thus the sensing node SO may be precharged. It is assumed that the voltage of the precharged sensing node SO is the precharge voltage Vpre.

The first bit line precharge signal 1PRE having the second turn-on voltage 2Von may be applied to the first bit line precharge switch 1PS, and the second bit line precharge signal 2PRE having the first turn-on voltage 1Von may be applied to the second bit line precharge switch 2PS. Accordingly, the power voltage VCC may be supplied to the second node 2ND.

Because all of the select switch SS, the common transmission switch CT, and the sensing switch SENS are turned on, the bit line BL and the sensing node SO may be electrically connected to each other. In the precharge step, a first turn-off voltage 1Voff may be applied to the selected word line Sel_WL and the unselected word lines Unsel_WL, but the pass voltage Vpass may also be applied to the selected word line Sel_WL and the unselected word lines Unsel_WL. The first turn-off voltage 1Voff may be set to 0V or a negative voltage lower than 0V. The pass voltage Vpass may be set to a positive voltage to turn on the memory cells. The first and second setup signals 1SET and 2SET may be set to a second turn-off voltage 2Voff.

When the precharge step is ended and the second time point S2 arrives, the evaluation step may be performed. In the evaluation step, a sensing operation of sensing the threshold voltage of the memory cells may be simultaneously performed. When the evaluation step is started at the second time point S2, the verify voltage Vf may be applied to the selected word line Sel_WL, and the pass voltage Vpass may be applied to the unselected word lines Unsel_WL. A level of the sensing node precharge signal SPG may transit from the second turn-on voltage 2Von to the second turn-off voltage 2Voff. Because the second turn-off voltage 2Voff is set to a positive voltage higher than 0V, the sensing node precharge switch SPS may be turned off.

Because all of the select switch SS, the common transmission switch CT, and the sensing switch SENS are turned on, the sensing node SO and the bit line BL may be electrically connected to each other. A difference may occur in a speed at which the voltage of the sensing node SO is decreased according to the threshold voltage of the memory cells. For example, a first evaluation step may be performed at a third time point S3. For the first evaluation step, the first setup signal 1SET may transit from the second turn-off voltage 2Voff to the second turn-on voltage 2Von at the third time point S3. When the first setup signal 1SET transits to the second turn-on voltage 2Von, because the first setup switch 1ST is turned on, the first evaluation step may be performed according to the select data stored in the first latch 1LAT. In the first evaluation step, the low-level cells Lc corresponding to the memory cells of which a voltage of the sensing node SO is higher than the reference voltage Vtrip may be detected.

A second evaluation step may be performed at a fourth time point S4. For the second evaluation step, the second setup signal 2SET may transit from the second turn-off voltage 2Voff to the second turn-on voltage 2Von at the fourth time point S4. When the second setup signal 2SET transits to the second turn-on voltage 2Von, because the second setup switch 2ST is turned on, the second evaluation step may be performed according to the select data stored in the second latch 2LAT. In the second evaluation step, the high-level cells Hc corresponding to the memory cells of which the voltage of the sensing node SO is higher than the reference voltage Vtrip may be detected. In the second evaluation step, the voltage of the sensing node SO corresponding to the low-level cells Lc may become lower than the reference voltage Vtrip, but because the low-level cells Lc are determined as cells on which program is already completed at the third time point S3, an additional evaluation operation is not performed. When the second evaluation step is ended, the first setup signal 1SET may transit from the second turn-on voltage 2Von to the second turn-off voltage 2Voff. At the fifth time point S5 when all evaluation steps are ended, a potential of all lines may be initialized. For example, at the fifth time point S5, all lines may be discharged.

Figure 9:
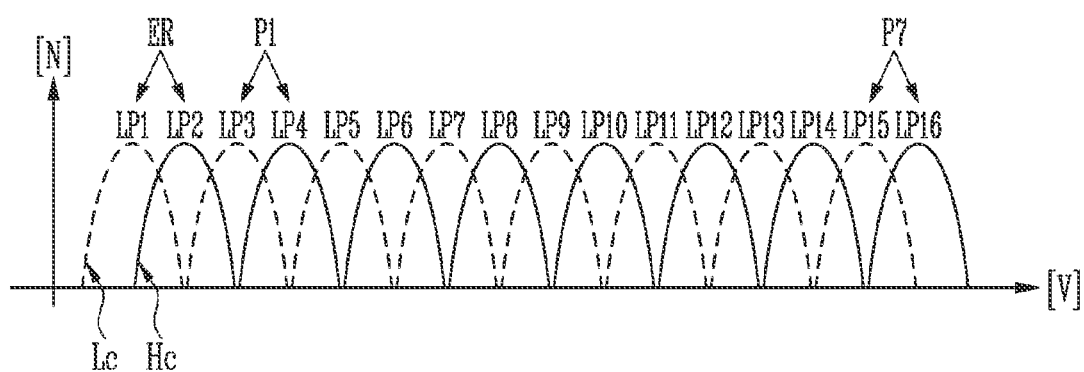
FIG. 9 is a diagram illustrating a verify operation according to a second embodiment of the present disclosure.

FIG. 9 is a diagram illustrating a verify operation according to a second embodiment of the present disclosure.

Referring to FIG. 9, when the logic data used for the program operation is configured of 3 bits of data, the logic data may include the MSB, CSB, and LSB data. Although the program operation is performed according to the logic data, memory cells configuring one threshold voltage distribution may be divided into the high-level cell Hc and the low-level cell Lc during the verify operation according to the present embodiment. Therefore, the memory cells on which the program operation is completed may be programmed to have more threshold voltage distributions than the number of threshold voltage distributions corresponding to the logic data.

In the second embodiment, memory cells to be maintained in the erase state ER or programmed to the first to seventh program states P1 to P7 may be programmed to first to sixteenth logic program states LP1 to LP16.

For example, the memory cells to be maintained in the erase state ER according to the logic data may be programmed to the first or second logic program state LP1 or LP2 by the program operation according to the second embodiment. Cells corresponding to the first logic program state LP1 may become the low-level cells Lc, and cells corresponding to the second logic program state LP2 may become the high-level cells Hc. The memory cells to be programmed to the first program state P1 according to the logic data may be programmed to the third or fourth logic program state LP3 or LP4 by the program operation according to the second embodiment.

In such a method, the memory cells to be programmed to the seventh program state P7 according to the logic data may be programmed to the fifteenth or sixteenth logic program state LP15 or LP16 by the program operation according to the second embodiment.

Therefore, the memory cells programmed according to the second embodiment may be programmed to any one of the first to sixteenth logic program states LP1 to LP16.

Figure 10:
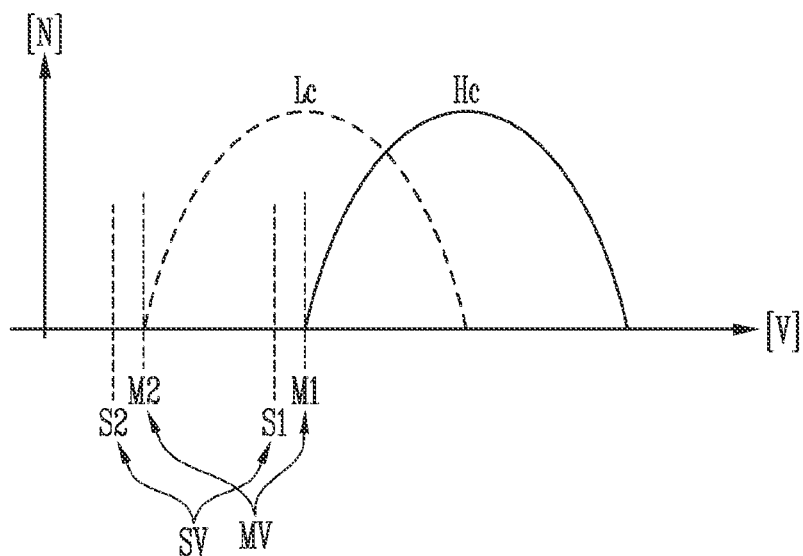
FIGS. 10 and 11 are diagrams illustrating a verify operation according to a third embodiment of the present disclosure.
Figure 11:
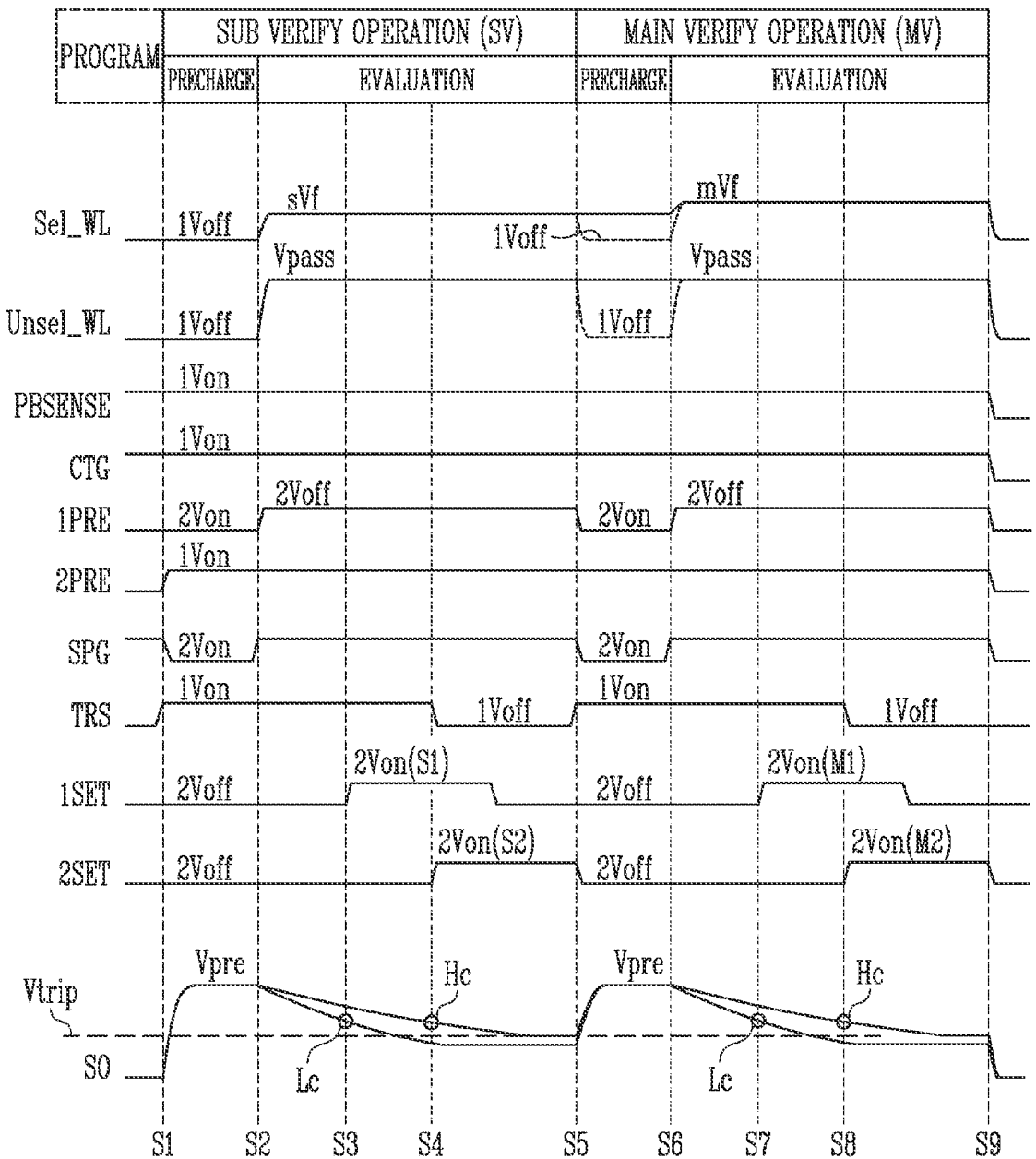

FIGS. 10 and 11 are diagrams illustrating a verify operation according to a third embodiment of the present disclosure, FIG. 10 is a diagram illustrating a double verify operation according to the third embodiment, and FIG. 11 is a timing diagram illustrating the double verify operation according to the third embodiment.

Referring to FIG. 10, the double verify operation may include a sub verify operation SV and a main verify operation MV. The sub verify operation SV may be an operation performed before the main verify operation MV is performed in a program loop, and may be performed to decrease a program speed of the memory cells of which the threshold voltage is increased to around the target voltage. Decreasing the program speed of the memory cells means decreasing a variation amount of the threshold voltage. Therefore, the double verify operation may narrow the threshold voltage distribution of the memory cells.

According to a present embodiment, because the memory cells may be divided into the high-level cell Hc and the low-level cell Lc, the double verify operation may be performed on each of the high-level cell Hc and the low-level cell Lc. For example, in the main verify operation MV of the high-level cell Hc, a first main verify voltage M1 may be used, and in the sub verify operation SV, a first sub verify voltage S1 lower than the first main verify voltage M1 may be used. In the main verify operation MV of the low-level cell Lc, a second main verify voltage M2 lower than the first sub verify voltage S1 may be used, and in the sub verify operation SV, a second sub verify voltage S2 lower than the second main verify voltage M2 may be used.

During a program operation of cells of which the sub verify operation SV is passed, a voltage between the program allowable voltage and the program inhibit voltage may be applied to the bit lines. The program allowable voltage may be a voltage applied to the lines of memory cells having a large difference between the target voltage and the threshold voltage, and may be applied to bit lines of memory cells of which the sub verify operation SV is not passed. The program inhibit voltage may be applied to bit lines of memory cells of which the main verify operation MV is passed. The verify operation according to the third embodiment to which the double verify operation is applied is as follows.

Referring to FIGS. 3, 10, and 11, when the program step in which the program voltage is applied to the selected word line connected to the selected page is ended, the verify operation may be performed. The verify operation may include the sub verify operation SV and the main verify operation MV. Each of the sub verify operation SV and the main verify operation MV may include the precharge step and the evaluation step.

The precharge step of the sub verify operation SV may be performed between a first time point S1 and a second time point S2, and the evaluation step may be performed between the second time point S2 and a fifth time point S5. It is assumed that select data of '1' is input to the first latch 1LAT, select data of '0' is input to the second latch 2LAT, and the logic data is input to the third to fifth latches 3LAT to 5LAT.

At the first time point S1, the sensing signal PBSENSE having the first turn-on voltage 1Von, the common transmission signal CTG, the second bit line precharge signal 2PRE, the select signal TRS, the first bit line precharge signal 1PRE having the second turn-on voltage 2Von, and the sensing node precharge signal SPG may be applied to the sensing switch SENS, the common transmission switch CT, the second bit line precharge switch 2PS, the select switch SS, the first bit line precharge switch 1PS, and the sensing node precharge switch SPS, respectively.

Because the sensing node precharge switch SPS is implemented with the PMOS transistor, the sensing node precharge signal SPG may be set to the second turn-on voltage 2Von lower than the first turn-on voltage 1Von. For example, the first turn-on voltage 1Von may be set to a positive voltage higher than 0V, and the second turn-on voltage 2Von may be set to 0V or a negative voltage lower than 0V. When the sensing node precharge switch SPS is turned on, the power voltage may be supplied to the sensing node SO, and thus the sensing node SO may be precharged. It is assumed that the voltage of the precharged sensing node SO is the precharge voltage Vpre.

The first bit line precharge signal 1PRE having the second turn-on voltage 2Von may be applied to the first bit line precharge switch 1PS, and the second bit line precharge signal 2PRE having the first turn-on voltage 1Von may be applied to the second bit line precharge switch 2PS. Accordingly, the power voltage VCC may be supplied to the second node 2ND.

Because all of the select switch SS, the common transmission switch CT, and the sensing switch SENS are turned on, the bit line BL and the sensing node SO may be electrically connected to each other. In the precharge step, the first turn-off voltage 1Voff may be applied to the selected word line Sel_WL and the unselected word lines Unsel_WL, but the pass voltage Vpass may also be applied to the selected word line Sel_WL and the unselected word lines Unsel_WL. The first turn-off voltage 1Voff may be set to 0V or a negative voltage lower than 0V. The pass voltage Vpass may be set to a positive voltage to turn on the memory cells. The first and second setup signals 1SET and 2SET may be set to the second turn-off voltage 2Voff.

When the precharge step is ended and the second time point S2 arrives, the evaluation step may be performed. In the evaluation step, the sensing operation of sensing the threshold voltage of the memory cells may be simultaneously performed. When the evaluation step is started at the second time point S2, a sub verify voltage sVf may be applied to the selected word line Sel_WL, and the pass voltage Vpass may be applied to the unselected word lines Unsel_WL. The level of the sensing node precharge signal SPG may transit from the second turn-on voltage 2Von to the second turn-off voltage 2Voff. Because the second turn-off voltage 2Voff is set to a positive voltage higher than 0V, the sensing node precharge switch SPS may be turned off.

Because all of the select switch SS, the common transmission switch CT, and the sensing switch SENS are turned on, the sensing node SO and the bit line BL may be electrically connected to each other. A difference may occur in a speed at which the voltage of the sensing node SO is decreased according to the threshold voltage of the memory cells. For example, the first evaluation step may be performed at a third time point S3. For the first evaluation step, the first setup signal 1SET may transit from the second turn-off voltage 2Voff to the second turn-on voltage 2Von at the third time point S3. When the first setup signal 1SET transits to the second turn-on voltage 2Von, because the first setup switch 1ST is turned on, the first evaluation step may be performed according to the select data stored in the first latch 1LAT. In the first evaluation step, the low-level cells Lc corresponding to the memory cells of which the voltage of the sensing node SO is higher than the reference voltage Vtrip may be detected.

The second evaluation step may be performed at a fourth time point S4. For the second evaluation step, the second setup signal 2SET may transit from the second turn-off voltage 2Voff to the second turn-on voltage 2Von at the fourth time point S4. When the second setup signal 2SET transits to the second turn-on voltage 2Von, because the second setup switch 2ST is turned on, the second evaluation step may be performed according to the select data stored in the second latch 2LAT. In the second evaluation step, the high-level cells Hc corresponding to the memory cells of which the voltage of the sensing node SO is higher than the reference voltage Vtrip may be detected. In the second evaluation step, the voltage of the sensing node SO corresponding to the low-level cells Lc may become lower than the reference voltage Vtrip, but because the low-level cells Lc are determined as cells on which program is already completed at the third time point S3, an additional evaluation operation is not performed. When the second evaluation step is ended, the first setup signal 1SET may transit from the second turn-on voltage 2Von to the second turn-off voltage 2Voff. At the fifth time point S5 when the evaluation step of the sub verify operation SV is ended, the precharge step of the main verify operation MV may be started.

The precharge step of the main verify operation MV may be performed between the fifth time point S5 and a sixth time point S6, and the evaluation step may be performed between the sixth time point S6 and a ninth time point S9.

At the fifth time point S5, the sensing signal PBSENSE having the first turn-on voltage 1Von, the common transmission signal CTG, the second bit line precharge signal 2PRE, the select signal TRS, the first bit line precharge signal 1PRE having the second turn-on voltage 2Von, and the sensing node precharge signal SPG may be applied to the sensing switch SENS, the common transmission switch CT, the second bit line precharge switch 2PS, the select switch SS, the first bit line precharge switch 1PS, and the sensing node precharge switch SPS, respectively.

Because the sensing node precharge switch SPS is implemented with the PMOS transistor, the sensing node precharge signal SPG may be set to the second turn-on voltage 2Von lower than the first turn-on voltage 1Von. For example, the first turn-on voltage 1Von may be set to a positive voltage higher than 0V, and the second turn-on voltage 2Von may be set to 0V or a negative voltage lower than 0V. When the sensing node precharge switch SPS is turned on, the power voltage may be supplied to the sensing node SO, and thus the sensing node SO may be precharged.

The first bit line precharge signal 1PRE having the second turn-on voltage 2Von may be applied to the first bit line precharge switch 1PS, and the second bit line precharge signal 2PRE having the first turn-on voltage 1Von may be applied to the second bit line precharge switch 2PS. Accordingly, the power voltage VCC may be supplied to the second node 2ND.

Because all of the select switch SS, the common transmission switch CT, and the sensing switch SENS are turned on, the bit line BL and the sensing node SO may be electrically connected to each other. In the precharge step, the sub verify voltage sVf may be applied to the selected word line Sel_WL and the pass voltage Vpass may be applied to the unselected word lines Unsel_WL. Alternatively, the first turn-off voltage 1Voff may be applied to the selected word line Sel_WL and the unselected word lines Unsel_WL. The first turn-off voltage 1Voff may be set to 0V or a negative voltage lower than 0V. The pass voltage Vpass may be set to a positive voltage to turn on the memory cells. The first and second setup signals 1SET and 2SET may be set to the second turn-off voltage 2Voff.

When the precharge step is ended and the sixth time point S6 arrives, the evaluation step may be performed. In the evaluation step, the sensing operation of sensing the threshold voltage of the memory cells may be simultaneously performed. When the evaluation step is started at the sixth time point S6, a main verify voltage mVf may be applied to the selected word line Sel_WL, and the pass voltage Vpass may be applied to the unselected word lines Unsel_WL. The level of the sensing node precharge signal SPG may transit from the second turn-on voltage 2Von to the second turn-off voltage 2Voff. Because the second turn-off voltage 2Voff is set to a positive voltage higher than 0V, the sensing node precharge switch SPS may be turned off.

Because all of the select switch SS, the common transmission switch CT, and the sensing switch SENS are turned on, the sensing node SO and the bit line BL may be electrically connected to each other. A difference may occur in a speed at which the voltage of the sensing node SO is decreased according to the threshold voltage of the memory cells. For example, the first evaluation step may be performed at a seventh time point S7. For the first evaluation step, the first setup signal 1SET may transit from the second turn-off voltage 2Voff to the second turn-on voltage 2Von at the seventh time point S7. When the first setup signal 1SET transits to the second turn-on voltage 2Von, because the first setup switch 1ST is turned on, the first evaluation step may be performed according to the select data stored in the first latch 1LAT. In the first evaluation step, the low-level cells Lc corresponding to the memory cells of which the voltage of the sensing node SO is higher than the reference voltage Vtrip may be detected.

The second evaluation step may be performed at an eighth time point S8. For the second evaluation step, the second setup signal 2SET may transit from the second turn-off voltage 2Voff to the second turn-on voltage 2Von at the eighth time point S8. When the second setup signal 2SET transits to the second turn-on voltage 2Von, because the second setup switch 2ST is turned on, the second evaluation step may be performed according to the select data stored in the second latch 2LAT. In the second evaluation step, the high-level cells Hc corresponding to the memory cells of which the voltage of the sensing node SO is higher than the reference voltage Vtrip may be detected. In the second evaluation step, the voltage of the sensing node SO corresponding to the low-level cells Lc may become lower than the reference voltage Vtrip, but because the low-level cells Lc are determined as cells on which program is already completed at the seventh time point S7, an additional evaluation operation is not performed. When the second evaluation step is ended (S9), all lines may be discharged.

Figure 12:
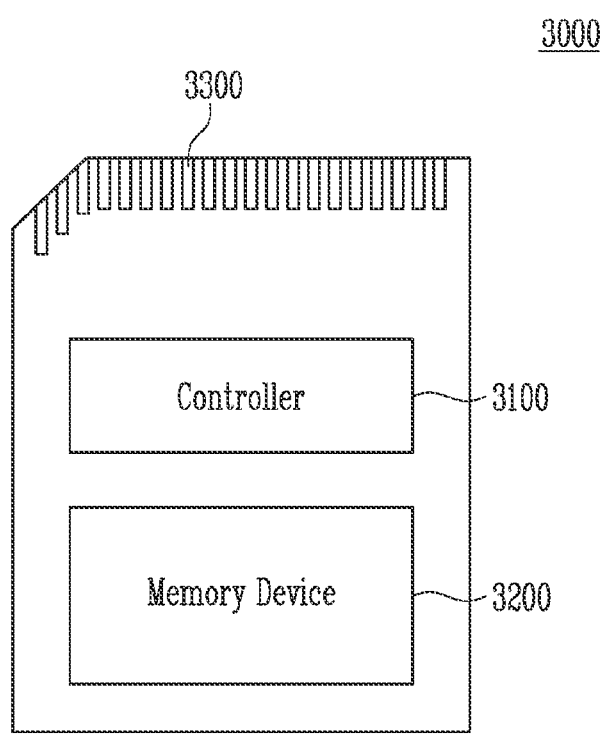
FIG. 12 is a diagram illustrating a memory card system to which a memory device of an embodiment of the present disclosure is applied.

FIG. 12 is a diagram illustrating a memory card system to which a memory device of an embodiment of the present disclosure is applied.

Referring to FIG. 12, the memory card system 3000 includes a controller 3100, a memory device 3200, and a connector 3300.

The controller 3100 is connected to the memory device 3200. The controller 3100 is configured to access the memory device 3200. For example, the controller 3100 may be configured to control a program, read, or erase operation of the memory device 3200 or to control a background operation. The controller 3100 is configured to provide an interface between the memory device 3200 and a host. The controller 3100 is configured to drive firmware for controlling the memory device 3200. For example, the controller 3100 may include components such as a random-access memory (RAM), a processing unit, a host interface, a memory interface, and an error correction circuit.

The controller 3100 may communicate with an external device through the connector 3300. The controller 3100 may communicate with an external device (for example, the host) according to a specific communication standard. For example, the controller 3100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

The memory device 3200 may include a plurality of memory cells, and may be configured identically to the memory device 100 shown in FIG. 1. Accordingly, the memory device 3200 may divide memory cells programmed according to one logic data into two different states.

The controller 3100 and the memory device 3200 may be integrated into one semiconductor device to configure a memory card. For example, the controller 3100 and the memory device 3200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
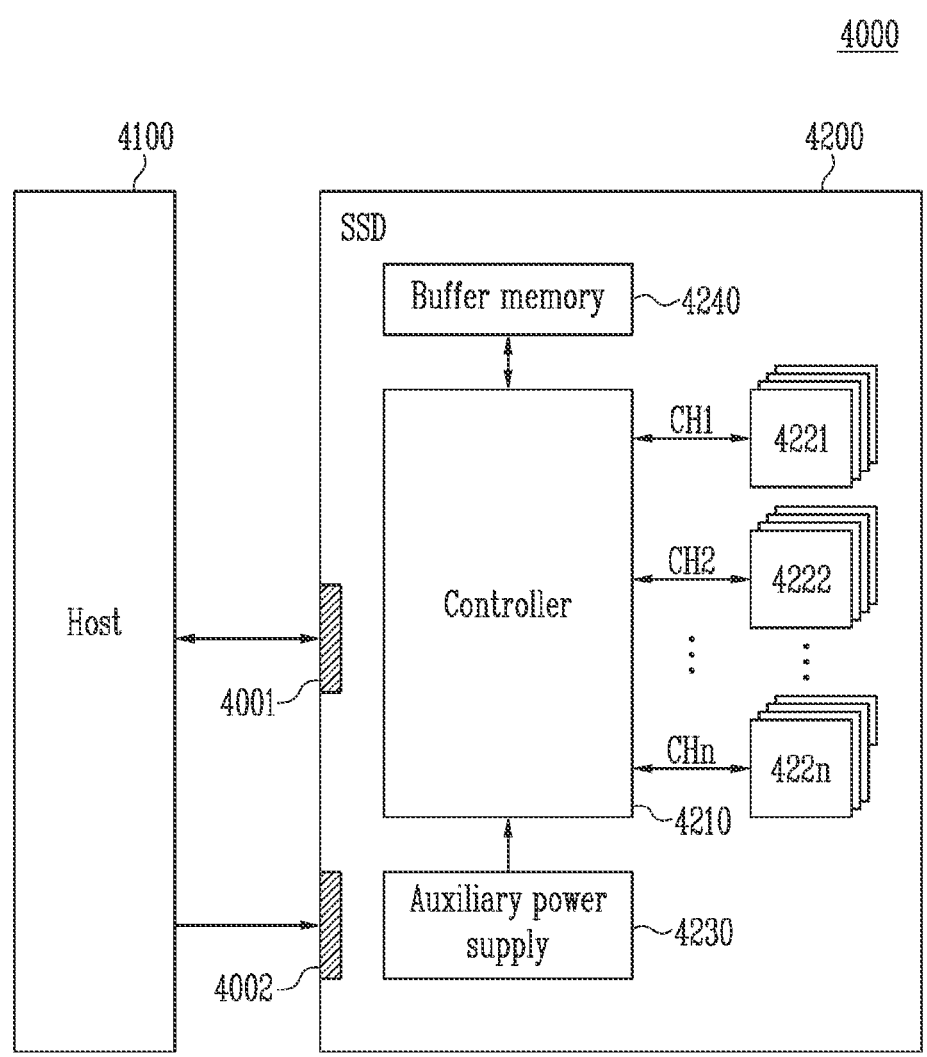
FIG. 13 is a diagram illustrating a solid state drive (SSD) system to which a memory device of an embodiment of the present disclosure is applied.

FIG. 13 is a diagram illustrating a solid state drive (SSD) system to which a memory device of an embodiment of the present disclosure is applied.

Referring to FIG. 13, the SSD system 4000 includes a host 4100 and an SSD 4200. The SSD 4200 exchanges a signal with the host 4100 through a signal connector 4001 and receives power through a power connector 4002. The SSD 4200 includes a controller 4210, a plurality of memory devices 4221 to 422n, an auxiliary power supply 4230, and a buffer memory 4240.

The controller 4210 may control the plurality of memory devices 4221 to 422n in response to the signal received from the host 4100. For example, the signal may be signals based on an interface between the host 4100 and the SSD 4200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The plurality of memory devices 4221 to 422n may include a plurality of memory cells configured to store data. Each of the plurality of memory devices 4221 to 422n may be configured identically to the memory device 100 shown in FIG. 1. Accordingly, each of the plurality of memory devices 4221 to 422n may divide memory cells programmed according to one logic data into two different states.

The plurality of memory devices 4221 to 422n may communicate with the controller 4210 through channels CH1 to CHn.

The auxiliary power supply 4230 is connected to the host 4100 through the power connector 4002. The auxiliary power supply 4230 may receive a power voltage from the host 4100 and charge the power voltage. The auxiliary power supply 4230 may provide a power voltage of the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may store data received from the host 4100 or data received from the plurality of memory devices 4221 to 422n, or may store meta data (for example, a mapping table) of the memory devices 4221 to 422n. The buffer memory 4240 may include a volatile memory such as a DRAM, an SDRAM, a DDR SDRAM, and an LPDDR SDRAM, or a nonvolatile memory such as an FRAM, a ReRAM, an STT-MRAM, and a PRAM.

What is claimed is:

1. A memory device comprising:
a memory block;
a peripheral circuit configured to increase a threshold voltage of memory cells selected among memory cells included in the memory block according to logic data, detect low-level cells having a threshold voltage higher than a reference voltage among memory cells having a threshold voltage lower than a verify voltage at a first time within a verify time set according the number of bits included in the logic data, and detect high-level cells having a threshold voltage higher than the verify voltage at a second time after the first time; and
a control circuit configured to control the peripheral circuit in response to a command.

2. The memory device of claim 1, wherein the peripheral circuit comprises:
page buffers connected to the memory block through bit lines and configured to store select data and the logic data; and
a voltage generator configured to supply a program voltage or the verify voltage to a selected word line among word lines connected to the memory block.

3. The memory device of claim 2, wherein each of the page buffers comprises:
latches configured to store the select data; and
latches configured to store the logic data.

4. The memory device of claim 2, wherein the select data includes first select data and second select data, wherein one of the first and second data is '0' and another data is '1'.

5. The memory device of claim 4, wherein each of the first select data and the second select data includes at least 1 bit of data.

6. The memory device of claim 4, wherein the low-level cell is detected according to the first select data, and the high-level cell is detected according to the second select data.

7. The memory device of claim 1, wherein the peripheral circuit switches cells detected as the low-level cells into unselected memory cells while a program operation of the selected memory cells is performed.

8. A method of operating a memory device, the method comprising:
setting a verify voltage and a verify time according to the number of bits of logic data;
increasing a threshold voltage of memory cells;
detecting low-level cells having a threshold voltage higher than a reference voltage among memory cells having a threshold voltage lower than a verify voltage;
detecting high-level cells having a threshold voltage higher than the verify voltage; and
designating new logic data comprising a number of bits greater than that of the logic data to the low-level cells and the high-level cells.

9. The method of claim 8, wherein detecting the low-level cells and detecting the high-level cells are sequentially performed within the verify time.

10. The method of claim 8, wherein the new logic data comprises at least 1 bit more data than the logic data.

11. The method of claim 8, wherein the logic data is input to latches included in page buffers, and
select data for detecting the low-level cells or the high-level cells is input to some of the latches.

12. The method of claim 11, wherein the select data is configured of different 1 bit of data.

13. A method of operating a memory device, the method comprising:
increasing a threshold voltage of selected memory cells among memory cells in an erase state; and
detecting memory cells having a threshold voltage lower than a reference voltage as a first logic program state and detecting memory cells having a threshold voltage higher than the reference voltage as a second logic program state higher than the first logic program state, among memory cells connected to even bit lines, among the selected memory cells.

14. The method of claim 13, wherein increasing the threshold voltage of the selected memory cells is performed according to logic data input to page buffers for a program operation.

15. The method of claim 13, wherein detecting the memory cells as the first logic program state is performed at a first time before a verify time set for a program operation after precharging the even bit lines and odd bit lines for a verify operation.

16. The method of claim 15, wherein detecting the memory cells as the second logic program state is performed at the set verify time.

* * * * *